(12) United States Patent
Takagi et al.

(10) Patent No.: US 7,657,908 B2
(45) Date of Patent: Feb. 2, 2010

(54) TELEVISION BROADCAST RECEIVER

(75) Inventors: Toshihiro Takagi, Daito (JP); Kazuhiko Tani, Daito (JP); Yasunori Matsuda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 597 days.

(21) Appl. No.: 11/501,068

(22) Filed: Aug. 9, 2006

(65) Prior Publication Data

US 2007/0039029 A1 Feb. 15, 2007

(30) Foreign Application Priority Data

Aug. 9, 2005 (JP) ............................. 2005-231338
Aug. 9, 2005 (JP) ............................. 2005-231352

(51) Int. Cl.
*H04N 5/445* (2006.01)
(52) U.S. Cl. ............................. 725/50; 725/13; 725/139
(58) Field of Classification Search ............... 725/9–21, 725/50, 140
See application file for complete search history.

(56) References Cited

U.S. PATENT DOCUMENTS

| 6,216,265 | B1 * | 4/2001 | Roop et al. .................... 725/54 |
| 6,337,719 | B1 * | 1/2002 | Cuccia ........................ 348/731 |
| 6,452,644 | B1 * | 9/2002 | Shimakawa et al. ......... 348/730 |
| 6,817,028 | B1 * | 11/2004 | Jerding et al. ................. 725/52 |
| 7,239,359 | B2 * | 7/2007 | Matsuyama et al. ......... 348/732 |
| 2003/0149981 | A1 * | 8/2003 | Finster et al. ................. 725/46 |
| 2005/0193415 | A1 * | 9/2005 | Ikeda ........................... 725/49 |
| 2006/0053451 | A1 * | 3/2006 | Lockrige et al. .............. 725/50 |
| 2006/0078298 | A1 * | 4/2006 | Nishikawa et al. ........... 386/83 |
| 2006/0090180 | A1 * | 4/2006 | Uz .............................. 725/39 |

FOREIGN PATENT DOCUMENTS

| JP | 7-87011 A | 3/1995 |
| JP | 10-42213 A | 2/1998 |
| JP | 10-70502 A | 3/1998 |
| JP | 2004-15800 A | 1/2004 |
| JP | 3607570 B2 | 10/2004 |
| JP | 2005-26810 A | 1/2005 |
| JP | 2005-33567 A | 2/2005 |
| JP | 2005-51613 A | 2/2005 |

* cited by examiner

*Primary Examiner*—Andrew Y Koenig
*Assistant Examiner*—Junior O Mendoza
(74) *Attorney, Agent, or Firm*—Crowell & Moring LLP

(57) ABSTRACT

Disclosed is a television broadcast receiver including: a reception member to receive a television broadcast signal with added time information; an acquirement member to acquire broadcast program information; program information storage member to store the broadcast program information; a time information storage member to store the time information; judgment member to judge whether a time period from interception of a power supply to re-activation is longer than a predetermined time or not, based on time information stored just before the interception and time information received just after the re-activation, the judgment being performed when the power supply of the television broadcast receiver is activated; and acquirement control member to make the acquirement member acquire new broadcast program information when the judgment member judges that the time period is longer than the predetermined time.

3 Claims, 9 Drawing Sheets

| | JAN. 1, 2005 | | | | | | JAN. 7, 2005 |
|---|---|---|---|---|---|---|---|
| | 00:00 | 01:00 | 02:00 | | 21:00 | 22:00 | 23:00 |
| 123ch | A | | | | X | | |
| 124ch | B | | | | | Y | |
| 125ch | C | | | | | Z | | ized in spite of having acquired the EPG information over
TELEVISION BROADCAST RECEIVER

BACKGROUND OF THE INVENTION

1. Field of the Invention

The present invention relates to a television broadcast receiver.

2. Description of Related Art

There have been conventionally analog broadcasting, broadcasting satellite (BS) digital broadcasting, communication satellite (CS) digital broadcasting, cable broadcasting and the like as receivable broadcast media by a television broadcast receiver. Furthermore, in recent years, ground wave digital broadcasting has also participated, and the number of receivable channels has increased more and more.

From broadcasting stations and the like which offer digital broadcasting, broadcast program information called as electronic program guide (EPG) information is also transmitted besides broadcast signals (image data and sound data) corresponding to each channel. And a user of a television broadcast receiver for digital broadcasting is enabled to select a channel suitable for his or her taste among various broadcasts with a program table based on the EPG information displayed on the display unit of the television broadcast receiver.

As television broadcast receivers acquiring the EPG information, for example, a television broadcast receiver acquiring the EPG information of all channels immediately after a power activation (see, for example, JP 2005-033567A), a television broadcast receiver acquiring the EPG information of a channel of which the EPG information should be acquired at a time when the EPG information should be acquired in accordance with a priority order based on a use history (see JP 2005-026810A), a television broadcast receiver which acquires only the EPG information which should be acquired based on the classification and the date of the EPG information and judges whether the EPG information which should be acquired have been able to be acquired without any interruption or not (see, for example JP 3607570B), and the like have been proposed.

Moreover, a television broadcast receiver acquiring EPG information by means of another reception method when the acquirement of the received EPG information has not been completed (see, for example, JP 2005-051613A), a television broadcast receiver displaying a setting screen for setting the information for receiving a broad cast signal on a display unit at the time of a power activation in the case where the information has not been set (see, for example, JP 10-042213A), and the like have been also proposed.

The television broadcast receivers mentioned above are configured to be able to store the acquired EPG information. Moreover, it is known that a time necessary for acquiring EPG information one time becomes long as the quantity of the EPG information to be acquired increases.

For example, as the television broadcast receivers disclosed in JP 2005-026810A and JP 3607570B, the time necessary for acquiring EPG information one time can be shortened in the case of acquiring only the EPG information which should be acquired. However, if the privilege of a user capable of selecting a channel suitable for his or her taste among various broadcasts is limited, the limitation is problematic.

Moreover, as the television broadcast receiver disclosed in JP 2005-033567A, when the EPG information of all channels is acquired immediately after a power activation, a user can select a channel suitable for his or her taste among various broadcasts. However, because EPG information is acquired every turning on and off of a power source even if the turning on and off are very frequently repeated, the EPG information the contents of which are hardly different from those stored in advance in spite of having acquired the EPG information over time. Consequently, the television broadcast receiver has a problem of efficiency.

On the other hand, in the North America Continent, where the ATSC digital television broadcast (hereinafter simply referred to as television broadcast) is performed, large cities are dotted on the plains. Consequently, it is possible to receive the television broadcast signals being broadcast in the suburbs of each city at other cities and middle points between the cities. Because television broadcast signals are transmitted from various directions for a user who receives the television broadcast signals, it is necessary for the user to adjust the direction of an antenna to the direction of a broadcast station from which a program which the user wants to watch is broadcast. Accordingly, multi-directional antennas such as a smart antenna are being put to practical use.

Ground wave digital broadcasting has a feature of being capable of acquiring an image having a fixed image quality by a correction and the like if the intensity of a received digital broadcasting signal is equal to a fixed threshold value or more. Consequently, watching of television broadcasts of many channels becomes possible by using the multi-directional antenna.

In addition, the following technique has been known as an apparatus connected to the multi-directional antenna such as a smart antenna.

JP 10-70502A discloses a technique enabling communications with a plurality of mobile stations with little transmission power and a small repetition frequency by suppressing the radiation of electric waves into the directions other than the direction of a mobile station with which communication is performed to remove the disturbances of the radiation to other base stations and mobile stations. To realize the communications, the technique presumes the arrival of the electric wave from the mobile station with which the communications are performed with arrival direction presumption means using the signals received by a base station to presume the direction of the mobile station, and turns the peak direction of the directivity of the directivity beam of an antenna toward the direction of the mobile station with antenna directivity control means based on the result of the presumption to suppress the radiation.

Moreover, JP 2004-15800A discloses a technique for optimizing the reception direction of an antenna by re-using a previous antenna configuration at the time of the deterioration of the performance of the antenna by a fixed amount when the reception signal after a restart or immediately after a start is smaller than a predetermined bit error rate, or when the intensity of a received signal is smaller than a predetermined intensity.

Moreover, JP 07-87011A discloses a radio communications system, a radio apparatus and a switch for performing communications with a movable body equipped with scanning means for scanning the circumference indirectly, measurement means for measuring the electric field intensity at a spot where the scanning means is located, and change means for changing the direction of a communication beam in the direction in which the strongest electric field intensity has been received by the measurement means.

According to the EIA-909 standard, the smart antenna is prescribed to have a reception direction in each division direction of a circle divided into 16 parts. A digital television broadcast signal reception apparatus receiving digital television broadcast signals is set to be able to adjust the reception direction of a multi-directional antenna to all the sixteen reception directions in conformity with the EIA-909 standard. Generally, the digital television broadcast signal reception apparatus previously performs the reception of a television broadcast signal in all of the sixteen reception directions of the multi-directional antenna for each channel capable of normal reception, and measures the signal reception intensities of the received television broadcast signals to set the direction in which the signal reception intensity is highest as the optimum reception direction of the channel.

Because the antenna on the side of a broadcasting station, i.e. the position of a transmission tower, does not change ordinarily, if the optimum reception direction is once set to each channel, it is unnecessary to reset the optimum reception direction anew. However, in the United States of America or the like, broadcasting stations are dotted in various parts of the country, and consequently the direction in which the signal reception intensity is stronger is not always the optimum reception direction in some paths of the electric waves put on the air from the electric wave towers. For example, a better image may be acquired from a television broadcast signal wave reflected by a high-rise building in comparison with the images acquired from a television broadcast signal wave disturbed by a disturbance wave caused by a power-transmission line or the like, a television broadcast signal wave which has been attenuated by passing through a forest, and the like. The patent documents mentioned above disclose no solutions to the problem.

It is an object of the present invention to provide a television broadcast receiver which can effectively acquire EPG information. Moreover, it is also an object of the invention to provide a television broadcast receiver enabling a user to select the optimum image channel to watch it without adding any special apparatus.

SUMMARY OF THE INVENTION

In order to achieve the above-described object, according to a first aspect of the invention, a television broadcast receiver comprises: a reception member to receive a television broadcast signal with added time information from a television broadcast wave; an acquirement member to acquire broadcast program information from the television broadcast wave; a program information storage member to store the broadcast program information acquired by the acquirement member; a time information storage member to store the time information added to the television broadcast signal received by the reception member; a judgment member to judge whether a time period from an interception of a power supply to the television broadcast receiver to a re-activation of the power supply is longer than a predetermined time or not, based on time information stored in the time information storage member just before the interception of the power supply to the television broadcast receiver, and time information added to the television broadcast signal received by the reception member just after the activation of the power supply to the television broadcast receiver, the judgment being performed when the power supply of the television broadcast receiver is activated; and an acquirement control member to make the acquirement member acquire new broadcast program information when the judgment member judges that the time period from the interception of the power supply to the television broadcast receiver to the re-activation of the power supply is longer than the predetermined time.

According to the present invention, it is possible to make the acquirement means acquire the new broadcast program information with the acquirement control means only when the judgment means judges that the time from the interception of the power supply of the television broadcast receiver to the re-activation of the power supply is longer than the predetermined time when the power supply of the television broadcast receiver is activated.

Consequently, the television broadcast receiver can efficiently acquire the broadcast program information because the television broadcast receiver acquires the broadcast program information only when the time when the power supply of the television broadcast receiver has been intercepted is long and as a result the un-broadcast broadcast program information stored in the program information storage means is little or there is no un-broadcast broadcast program information stored in the program information storage means at the time of the activation of the power supply of the television broadcast receiver.

Preferably, the television broadcast receiver of the first aspect further comprises a setting member to set the predetermined time period.

Thereby, by setting the predetermined time, it becomes possible for a user to set the quantity of the un-broadcast broadcast program information stored in the program information storage means, and then the user can comfortably browse the broadcast program information or can select a channel suited to his or her taste from the broadcast program information.

Preferably, the reception member is connectable with a multi-directional antenna, transmits a control signal which makes only one reception direction active among a plurality of reception directions to an antenna controller controlling directivity, and the reception member comprises: a control unit to set a reception direction of the television broadcast signal of the multi-directional antenna; a tuner unit to perform an initial channel setting operation; a signal processing unit to perform predetermined signal processing to the television broadcast signal received by the tuner unit; and a storage unit to store a signal transmitted from the signal processing unit to the control unit, wherein the control unit outputs at a predetermined time interval the control signal so that only one of the plurality of the reception directions of the multi-directional antenna is active, the signal processing unit performs the predetermined processing to the television broadcast signal of a channel received by the tuner unit at the initial setting, so as to acquire signal reception intensity data to all of the directions capable of receiving the channel, and the signal processing unit transmits the acquired signal reception intensity data to the control unit, and the control unit stores to the storage unit in a matrix the signal reception intensity data of each of the directions with respect to a channel, and when a certain channel is selected at normal reception, the control unit transmits the control signal from the storage unit to the antenna controller in an order of largeness of the corresponding signal reception intensities, and changes an video corresponding to the activated reception direction, so that a user can set a desired video.

According to the present invention, because the user can determine the optimum screen while looking at the image, it is possible to avoid the situation of receiving an image which is difficult for the user to look at although the reception intensity of the image is strong. Moreover, according to the digital television broadcast reception apparatus of the present invention, because it is only necessary to store the reception intensity of each channel in the storage unit, it is possible to display the optimum desired screen desired by the user without performing any change of design of hardware and without increasing the cost of equipment.

According to a second aspect of the invention, a broadcast receiver comprises: a reception member to receive a television broadcast signal with added time information from a television broadcast wave; an acquirement member to acquire broadcast program information from the television broadcast wave; a program information storage member to store the broadcast program information acquired by the acquirement member; an extraction member to extract broadcast time information of a previously set final broadcast program among final broadcast programs of respective channels from the broadcast program information stored in the program information storage member; a judgment member to judge whether a remaining broadcast time period of an un-broadcast broadcast program on the broadcast program information stored in the program information storage member is shorter than a predetermined time or not, based on the broadcast time information extracted by the extraction member, and the time information added to the television broadcast signal received by the reception member just after an activation of the power supply of the television broadcast receiver, the judgment being performed when the power supply to the television broadcast receiver is activated; and an acquirement control member to make the acquirement member acquire new broadcast program information when the judgment member judges that the remaining broadcast time period of the un-broadcast broadcast program on the broadcast program information stored in the program information storage member is shorter than the predetermined time.

According to the present invention, it is possible to make the acquirement means acquire the new broadcast program information with the acquirement control means only when the judgment means judges that the broadcast time of the un-broadcast broadcast program in the broadcast program information stored in the program information storage means is shorter than the predetermined time when the power supply of the television broadcast receiver is activated.

Consequently, the television broadcast receiver can efficiently acquire the broadcast program information because the television broadcast receiver acquires the broadcast program information only when the time when the power supply of the television broadcast receiver has been intercepted is long and as a result the un-broadcast broadcast program information stored in the program information storage means is little or there is no un-broadcast broadcast program information stored in the program information storage means at the time of the activation of the power supply of the television broadcast receiver.

Preferably, the television broadcast receiver of the second aspect further comprises a setting member to set the predetermined time.

Thereby, by setting the predetermined time, it becomes possible for a user to set the quantity of the un-broadcast broadcast program information stored in the program information storage means, and then the user can comfortably browse the broadcast program information or can select a channel suited to his or her taste from the broadcast program information.

Preferably, the reception member is connectable with a multi-directional antenna, transmits a control signal which makes only one reception direction active among a plurality of reception directions to an antenna controller controlling directivity, and the reception member comprises: a control unit to set a reception direction of the television broadcast signal of the multi-directional antenna; a tuner unit to perform an initial channel setting operation; a signal processing unit to perform predetermined signal processing to the television broadcast signal received by the tuner unit; and a storage unit to store a signal transmitted from the signal processing unit to the control unit, wherein the control unit outputs at a predetermined time interval the control signal so that only one of the plurality of the reception directions of the multi-directional antenna is active, the signal processing unit performs the predetermined processing to the television broadcast signal of a channel received by the tuner unit at the initial setting, so as to acquire signal reception intensity data to all of the directions capable of receiving the channel, and the signal processing unit transmits the acquired signal reception intensity data to the control unit, and the control unit stores to the storage unit in a matrix the signal reception intensity data of each of the directions with respect to a channel, and when a certain channel is selected at normal reception, the control unit transmits the control signal from the storage unit to the antenna controller in an order of largeness of the corresponding signal reception intensities, and changes an video corresponding to the activated reception direction, so that a user can set a desired video.

According to the present invention, because the user can determine the optimum screen while looking at the image, it is possible to avoid the situation of receiving an image which is difficult for the user to look at although the reception intensity of the image is strong. Moreover, according to the digital television broadcast reception apparatus of the present invention, because it is only necessary to store the reception intensity of each channel in the storage unit, it is possible to display the optimum desired screen desired by the user without performing any change of design of hardware and without increasing the cost of equipment.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein;

FIG. 4 is a view showing the EPG information stored in an EPG information storage region shown in FIG. 3;

DETAILED DESCRIPTION OF THE PREFERRED EMBODIMENTS

In the following, the best mode of a television broadcast receiver according to the present invention will be described in detail with reference to the attached drawings. In addition, the scope of the invention is not limited to the shown examples.

First Embodiment

First, a television broadcast receiver 10 in a first embodiment is described.

<Configuration of Television Broadcast Receiver>

First, the configuration of the television broadcast receiver 10 is described with reference to FIG. 1.

Figure 1:
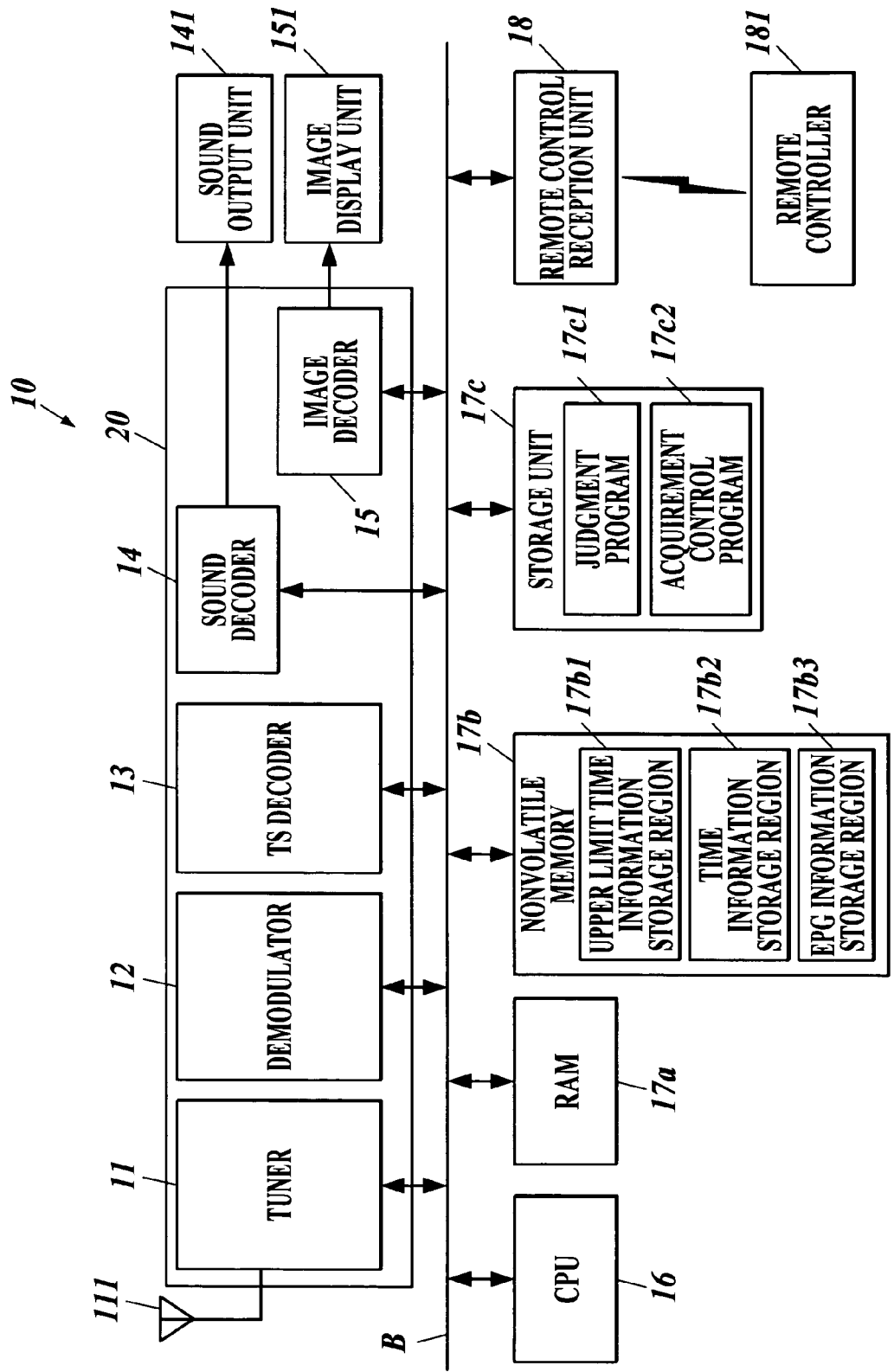
FIG. 1 is a block diagram showing the functional configuration of a television broadcast receiver of a first embodiment.

The television broadcast receiver 10 is, for example, as shown in FIG. 1, composed of a tuner 11 including an antenna 111, a demodulator 12, a transport stream (TS) decoder 13, a sound decoder 14, a sound output unit 141 connected to the sound decoder 14, an image decoder 15, an image display unit 151 connected to the image decoder 15, a central processing unit (CPU) 16, a random access memory (RAM) 17a, a nonvolatile memory 17b, a storage unit 17c, a remote control reception unit 18, a remote controller 181 for the television broadcast receiver 10 (hereinafter referred to as "remote control 181") capable of performing communications with the remote control reception unit 18, and the like. The tuner 11, the demodulator 12, the TS decoder 13, the sound decoder 14, the image decoder 15, the CPU 16, the RAM 17a, the nonvolatile memory 17b, the storage unit 17c and the remote control reception unit 18 are connected with one another by a bus B.

The tuner 11 includes the antenna 111, and the tuner 11 and the antenna 111 constitute reception means and acquirement means.

To put it concretely, the tuner 11 and the antenna 111 receive a television broadcast signal to which time information is added from a television broadcast wave as, for example, the reception means. More concretely, the tuner 11 receives the television broadcast signal that exists in the frequency band corresponding to the channel of a broadcast program which a user desire among, for example, the television broadcast waves of a digital system received by the antenna 111 in conformity to an instruction from the CPU 16, and the tuner 11 modulates the received television broadcast signal into an intermediate-frequency signal (IF signal) to output the modulated signal.

Moreover, the tuner 11 and the antenna 111 acquire EPG information from a television broadcast wave as broadcast program information as, for example, the acquirement means. More concretely, the tuner 11 acquires and outputs the EPG information (compressed EPG information) among the television broadcast waves received by the antenna 111 in conformity to an instruction of the CPU 16. In addition, the EPG information acquired by the tuner 11 is supposed to be the EPG information related to all channels receivable for the tuner 11 including the antenna 111.

The demodulator 12 executes the processing of digital demodulation, error correction and the like to the IF signal output from the tuner 11 in conformity to, for example, an instruction from the CPU 16, and outputs a stream (for example, a transport stream).

The TS decoder 13 decodes the transport stream output from the demodulator 12 to judge each transport packet constituting the transport stream in conformity to, for example, an instruction from the CPU 16, and separates the data of the transport packet related to the broadcast program which the user desires into compressed image data, compressed sound data, time information and the like to output the separated data.

The sound decoder 14 decodes the compressed sound data output from the TS decoder 13, and outputs the decoded sound data to the sound output unit 141 in conformity to, for example, an instruction from the CPU 16.

The sound output unit 141 is equipped with, for example, a not shown speaker, and outputs the sounds based on the sound data output from the sound decoder 14.

The image decoder 15 decodes the compressed image data output from the TS decoder 13 to output the decoded image data to the image display unit 151 in conformity to, for example, an instruction from the CPU 16.

Moreover, the image decoder 15 decodes the EPG information (the compressed EPG information) output from the tuner 11 to output the decoded EPG information to the image display unit 151 in conformity to, for example, an instruction from the CPU 16.

The image display unit 151 is equipped with a not shown display screen of, for example, a liquid crystal system or the like, and outputs the image based on the image data, the EPG information and the like, each output from the image decoder 15.

The CPU 16 performs various control operations in conformity to the various processing programs for the television broadcast receiver 10 which are stored in the storage unit 17c.

The RAM 17a is equipped with a program storage region for expanding the processing program and the like executed by the CPU 16, and a data storage region for storing input data, a processing result generated at the time of the execution of the processing program, and the like.

The nonvolatile memory 17b is composed of a flash memory capable of at least data rewriting, and the like.

To put it concretely, the nonvolatile memory 17b includes an upper limit time information storage region 17b1, a time information storage region 17b2, an EPG information storage region 17b3 and the like, as shown in FIG. 1, for example.

The upper limit time information storage region 17b1 stores upper limit time information relative to an upper limit time as a predetermined time set by the remote control 181. Here, the upper limit time information is the information to be used by the CPU 16 (to be mentioned later) which has executed a judgment program 17c1.

To put it concretely, when the remote control reception unit 18 receives a signal relative to the upper limit time set by an operation of the remote control 181 by the user from the remote control 181 and outputs the upper limit time information based on the signal, the CPU 16 makes the upper limit time information storage region 17b1 store the output upper limit time information.

In addition, it is supposed that the upper limit time information stored in the upper limit time information storage region 17b1 is updated every time when the upper limit time is set by the remote control 181.

The time information storage region 17b2 stores the time information added to a television broadcast signal received by the tuner 11 as time information storage means.

To put it concretely, when the time information separated from the television broadcast signal received by the tuner 11 is output from the TS decoder 13 through the demodulator 12 in conformity to an instruction of the CPU 16, the CPU 16 makes the time information storage region 17b2 store the output time information.

To put it more concretely, the CPU 16 makes the time information storage region 17b2 store the present time information separated from, for example, a system time table (STT) of the television broadcast signal received by the tuner 11.

In addition, it is supposed that the time information stored in the time information storage region 17b2 is updated one by one.

The EPG information storage region 17b3 stores the EPG program information acquired by the tuner 11 as program information storage means.

To put it concretely, when the tuner 11 acquires and outputs the EPG information in conformity to an instruction from the CPU 16, the CPU 16 makes the EPG information storage region 17b3 store the output EPG information. Moreover, when the tuner 11 acquires and outputs the EPG information transmitted regularly, the CPU 16 makes the EPG information storage region 17b3 store the output EPG information.

In addition, it is supposed that the EPG information stored in the EPG information storage region 17b3 is updated every time when the EPG information is acquired by the tuner 11.

The storage unit 17c stores a system program executable by the television broadcast receiver 10, various processing program executable by the system program, data used at the time of the execution of those various processing programs, data of various results of the operation processing by the CPU 16, and the like. In addition, the programs are stored in the storage unit 17c in the form of the program codes which a computer can read.

To put it concretely, the storage unit 17c stores the judgment program 17c1, an acquirement control program 17c2 and the like, for example, as shown in FIG. 1.

The judgment program 17c1 makes the CPU 16 realize the function of judging whether a time from an interception of the power supply of the television broadcast receiver 10 to a re-activation of the power supply is longer than the upper limit time set by the remote control 181 or not based on the time information stored in the time information storage region 17b2 of the nonvolatile memory 17b immediately before the interception of the power supply of the television broadcast receiver 10 and the time information added to the television broadcast signal received by the tuner 11 immediately after the activation of the power supply of the television broadcast receiver 10 when the power supply of the television broadcast receiver 10 is activated.

To put it concretely, the upper limit time set by the remote control 181 is the upper limit time based on the upper limit time information stored in the upper limit time information storage region 17b1 of the nonvolatile memory 17b.

Here the expression "the power supply of the television broadcast receiver 10 is intercepted" means that the power supply of the television broadcast receiver 10 is intercepted by, for example, by an depression of the power switch (not shown) of the television broadcast receiver 10, or that the power supply of the television broadcast receiver 10 is intercepted by unplugging of a plug (not shown) provided to the power code (not shown) of the television broadcast receiver 10 from an electric outlet (not shown).

Moreover, the expression "the power supply of the television broadcast receiver 10 is activated" means that the power supply of the television broadcast receiver 10 is activated by, for example, an insertion of the plug (not shown) provided to the power code (not shown) of the television broadcast receiver 10 into the electric outlet (not shown) and a depression of the power switch (not shown) of the television broadcast receiver 10.

The CPU 16 functions as judgment means by executing the judgment program 17c1 like this.

The acquirement control program 17c2 makes the CPU 16 realize the function of making the tuner 11 acquire new EPG information when the CPU 16, which has executed the judgment program 17c1, judges that the time from the interception of the power supply of the television broadcast receiver 10 to the re-activation of the power supply is longer than the upper limit time set by the remote control 181.

The CPU 16 functions as acquirement control means by executing the acquirement control program 17c2 like this.

The remote control reception unit 18 receives, for example, the various signals transmitted from the remote control 181, and outputs the information based on the various signals.

To put it concretely, the remote control 181 is used as setting means when a user set an upper limit time. When the remote control reception unit 18 receives a signal relative to the upper limit time set by the user from the remote control 181, the remote control reception unit 18 outputs the upper limit time information based on the received signal.

<EPG Information Acquirement Processing>

Figure 2:
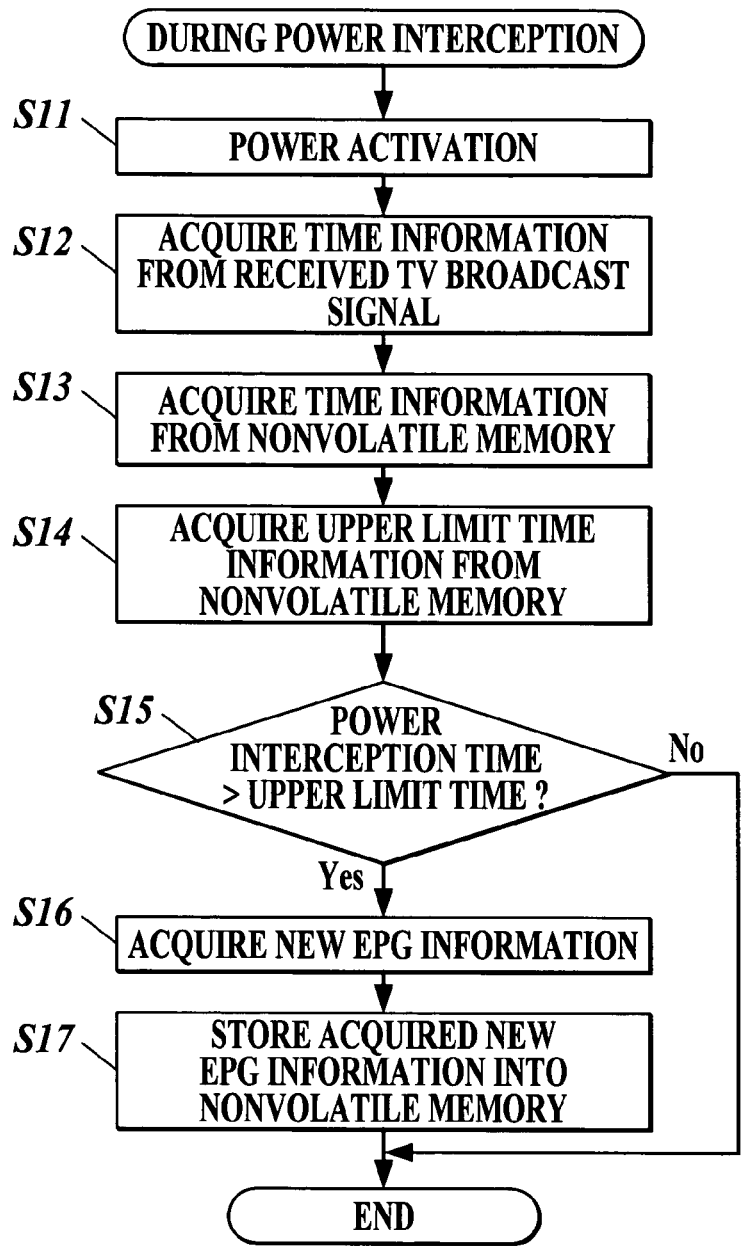
FIG. 2 is a flowchart for illustrating the processing of the acquirement of EPG information at the time of an activation of a power supply in the television broadcast receiver in the first embodiment.

Next, the processing relative to the acquirement of the EPG information at the time of an activation of the power supply of the television broadcast receiver 10 is described with reference to the flowchart of FIG. 2.

Here, it is supposed that the power supply of the television broadcast receiver 10 is intercepted as a premise.

First, when the power supply of the television broadcast receiver 10 is activated (Step S11), the CPU 16 acquires the time information added to the television broadcast signal from the television broadcast signal received by the tuner 11 through the demodulator 12 and the TS decoder 13 (Step S12).

Next, the CPU 16 acquires time information from the time information storage region 17b2 of the nonvolatile memory 17b (Step S13).

To put it concretely, at Step S13, the time information stored in the time information storage region 17b2 just before the interception of the power supply of the television broadcast receiver 10 is acquired.

Next, the CPU 16 acquires upper limit time information from the upper limit time information storage region 17b1 of the nonvolatile memory 17b (Step S14).

To put it concretely, at Step S14, the upper limit time information set by an operation of the remote control 181 by the user and stored in the upper limit time information storage region 17b1 in advance is acquired.

Next, the CPU 16 executes the judgment program 17c1 to judge whether the time from the interception of the power supply of the television broadcast receiver 10 to the re-activation of the power supply (power interception time) is longer than the upper limit time based on the upper limit time information acquired at Step S14 or not based on the time information acquired at Step S13 and the time information acquired at Step S12 (Step S15).

When the CPU 16 judges that the power interception time is not longer than the upper limit time (no at Step S15), the CPU 16 ends the present processing.

On the other hand, when the CPU 16 judges that the power interception time is longer than the upper limit time (yes at Step S15) at Step S15, the CPU 16 executes the acquirement control program 17c2 to make the tuner 11 acquire new EPG information (Step S16).

Next, the CPU 16 makes the EPG information storage region 17b3 of the nonvolatile memory 17b store the new EPG information acquired at Step S16 (Step S17), and ends the present processing.

According to the television broadcast receiver 10 in the first embodiment mentioned above, the tuner 11 can receive the television broadcast signal with the added time information from a television broadcast wave, and can acquire EPG information from the television broadcast wave. Then, the television broadcast receiver 10 can store the EPG information acquired by the tuner 11 in the EPG information storage region 17b3 of the nonvolatile memory 17b, and can store the time information added to the television broadcast signal received by the tuner 11 in the time information storage region 17b2 of the nonvolatile memory 17b. The television broadcast receiver 10 can set the upper limit time by the operation of the remote control 181 by a user, and can judge whether the time from an interception of the power supply of the television broadcast receiver 10 to a re-activation of the power supply is longer than the upper limit time set by the operation of the remote control 181 by the user or not based on the time information stored in the time information storage region 17b2 just before the interception of the power supply of the television broadcast receiver 10 and the time information added to the television broadcast signal received by the tuner 11 just after the activation of the power supply of the television broadcast receiver 10 with the CPU 16, which has executed the judgment program 17c1, when the power supply of the television broadcast receiver 10 is activated. When the CPU 16, which has executed the judgment program 17c1, judges that the time from the interception of the power supply of the television broadcast receiver 10 to the re-activation of the power supply is longer than the upper limit time set by the operation of the remote control 181 by the user, the television broadcast receiver 10 can make the tuner 11 acquire the new EPG information with the CPU 16, which has executed the acquirement control program 17c2.

Consequently, because the television broadcast receiver 10 acquires the EPG information only in the case where the time when the power supply of the television broadcast receiver 10 has been intercepted is long and then the un-broadcast EPG information stored in the EPG information storage region 17b3 is little, or in the case where there is no un-broadcast EPG information stored in the EPG information storage region 17b3 at the time point of an activation of the power supply of the television broadcast receiver 10 as the result, the television broadcast receiver 10 can efficiently acquire the EPG information.

Moreover, by setting the upper limit time, the user can set the quantity of the un-broadcast EPG information stored in the EPG information storage region 17b3, and then the user can comfortably browse EPG information and can select a channel suited for his or her taste from the EPG information.

Second Embodiment

Next, a television broadcast receiver 30 in a second embodiment is described.

<Configuration of Television Broadcast Receiver>

First, the configuration of the television broadcast receiver 30 is described with reference to FIG. 3.

In addition, the television broadcast receiver 30 of the second embodiment differs from the television broadcast receiver 10 of the first embodiment (FIG. 1) only in the judgment condition to judge that new EPG information should be acquired. To put it concretely, the television broadcast receiver 30 differs from the television broadcast receiver 10 (FIG. 1) in a part of the configuration of the nonvolatile memory 17b, a part of the configuration of the storage unit 17c, and a part of the configuration of the remote control 181 of the television broadcast receiver 10. Accordingly, descriptions will be given only to the different points, and the other common portions will be described with the same reference numerals as those of the first embodiment.

Figure 3:
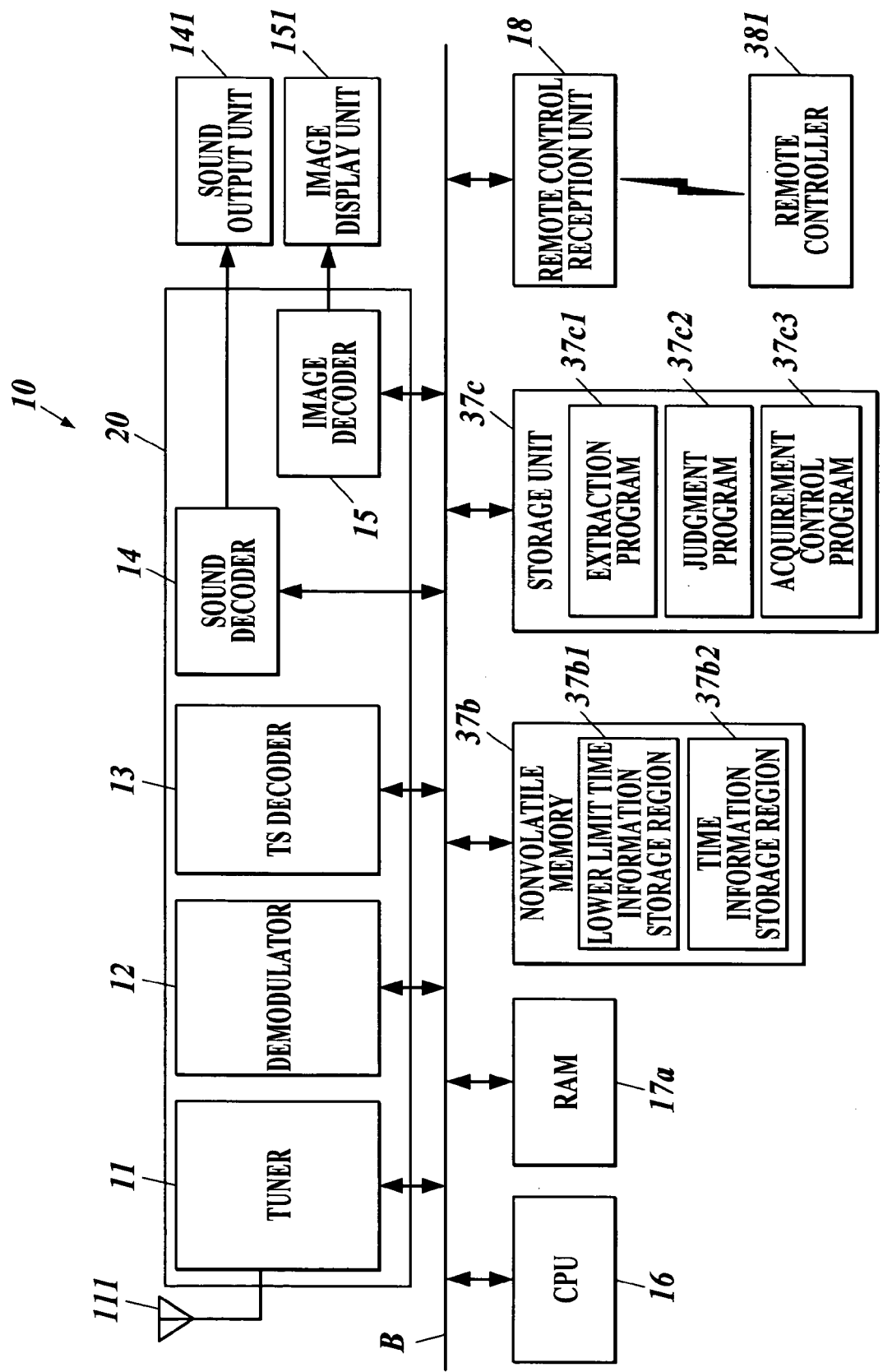
FIG. 3 is a block diagram showing the functional configuration of a television broadcast receiver in a second embodiment.

The television broadcast receiver 30 is, for example, as shown in FIG. 3, composed of the tuner 11 including the antenna 111, the demodulator 12, the TS decoder 13, the sound decoder 14, the sound output unit 141 connected to the sound decoder 14, the image decoder 15, the image display unit 151 connected to the image decoder 15, the CPU 16, the RAM 17a, a nonvolatile memory 37b, a storage unit 37c, the remote control reception unit 18, a remote controller 381 (hereinafter referred to as "remote control 381") for the television broadcast receiver 30 capable of performing communications with the remote control reception unit 18, and the like.

To put it concretely, the nonvolatile memory 37b includes a lower limit time information storage region 37b1, the EPG information storage region 17b3 and the like, as shown in FIG. 3, for example.

The lower limit time information storage region 37b1 stores lower limit time information relative to a lower limit time as a predetermined time set by the remote control 381. Here, the lower limit time information is the information to be used by the CPU 16 (to be mentioned later) which has executed a judgment program 37c2.

To put it concretely, when the remote control reception unit 18 receives a signal relative to the lower limit time set by an operation of the remote control 381 by a user from the remote control 381 and outputs the lower limit time information based on the signal, the CPU 16 makes the lower limit time information storage region 37b1 store the output lower limit time information.

In addition, it is supposed that the lower limit time information stored in the lower limit time information storage region 37b1 is updated every time when the lower limit time is set by the remote control 381.

To put it concretely, the storage unit 37c stores an extraction program 37c1, the judgment program 37c2, an acquirement control program 37c3 and the like, for example, as shown in FIG. 3.

The extraction program 37c1 makes the CPU 16 realize the function of extracting the broadcast time information of a previously set final broadcast program among the final broadcast programs of each channel from the EPG information stored in the EPG information storage region 17b3 of the nonvolatile memory 37b.

To put it concretely, for example, it is supposed that the EPG information as shown in FIG. 4, namely broadcast programs A, B, . . . , Y and Z included in channels 123ch, 124ch and 125ch during a broadcast time from 0:00 hour on Jan. 1, 2005 to 24:00 hour on Jan. 7, 2005, is stored in the EPG information storage region 17b3. Here, in the EPG information storage region 17b3 shown in FIG. 4, the broadcast time of the final broadcast program X of the channel 123ch is a time of from 21:00 to 24:00 on Jan. 7, 2005, the broadcast time of the final broadcast program Y of the channel 124ch is a time of from 21:30 to 23:00 on Jan. 7, 2005, and the broadcast time of the final broadcast program Z of the channel 125ch is a time of from 22:00 to 23:40 on Jan. 7, 2005.

When the CPU 16 executes the extraction program 37c1, the CPU 16 extracts the broadcast time information of the previously set final broadcast program among the final broadcast programs X, Y and Z of each of the channels 123ch, 124ch and 125ch, for example, the broadcast start time information "21:30 on Jan. 7, 2005" in the broadcast time information "21:30-23:00 on Jan. 7, 2005" of the final broadcast program Y, which is the earliest end program, from the EPG information stored in the EPG information storage region 17b3 shown in FIG. 4.

The CPU 16 functions as extraction means by executing the extraction program 37c1 like this.

The judgment program 37c2 makes the CPU 16 realize the function of judging whether a broadcast time of an un-broadcast broadcast program in the EPG information stored in the EPG information storage region 17b3 of the nonvolatile memory 37b is shorter than the lower limit time set by the remote control 381 or not based on the broadcast time information extracted by the CPU 16, which has executed the extraction program 37c1, and the time information added to the television broadcast signal received by the tuner 11 immediately after the activation of the power supply of the television broadcast receiver 30 at the time of an activation of the power supply of the television broadcast receiver 30.

To put it concretely, the lower limit time set by the remote control 381 is the lower limit time based on the lower limit time information stored in the lower limit time information storage region 37b1 of the nonvolatile memory 37b.

More concretely, if it is supposed that the lower limit time based on the lower limit time information stored in the lower limit time information storage region 37b1 is "48 hours", that the broadcast time information of the previously set final broadcast program extracted by the CPU 16, which has executed the extraction program 37c1, (for example, the broadcast start time information in the broadcast time information of the final broadcast program which is the earliest end program) is "21:30 on Jan. 7, 2005", and that the time information added to the television broadcast signal received by the tuner 11 immediately after an activation of the power supply of the television broadcast receiver 30 is "12:00 on Jan. 7, 2005", then the broadcast time of the un-broadcast broadcast program in the EPG information stored in the EPG information storage region 17b3 of the nonvolatile memory 37b is "9 hours and 30 minutes." Consequently, the CPU 16 executes the judgment program 37c2 to judge that the broadcast time is shorter than the lower limit time ("48 hours").

Here, the expressions "the power supply of the television broadcast receiver 30 is intercepted" and "the power supply of the television broadcast receiver 30 is activated" are the same expressions having the same meanings as those of "the power supply of the television broadcast receiver 10 is intercepted" and "the power supply of the television broadcast receiver 10 is activated", respectively.

The CPU 16 functions as the judgment means by executing the judgment program 37c2 like this.

The acquirement control program 37c3 makes the CPU 16 realize the function of making the tuner 11 acquire new EPG information when the CPU 16, which has executed the judgment program 37c2, judges that the broadcast time of the un-broadcast broadcast program in the EPG information stored in the EPG information storage region 17b3 of the nonvolatile memory 37b is shorter than the lower limit time set by the remote control 381.

The CPU 16 functions as the acquirement control means by executing the acquirement control program 37c3 like this.

The remote control reception unit 18 receives, for example, the various signals transmitted from the remote control 381, and outputs the information based on the various signals.

To put it concretely, as the setting means, the remote control 381 is used when a user set a lower limit time. When the remote control reception unit 18 receives a signal relative to the lower limit time set by the user from the remote control 381, the remote control reception unit 18 outputs the lower limit time information based on the received signal.

<EPG Information Acquirement Processing>

Figure 5:
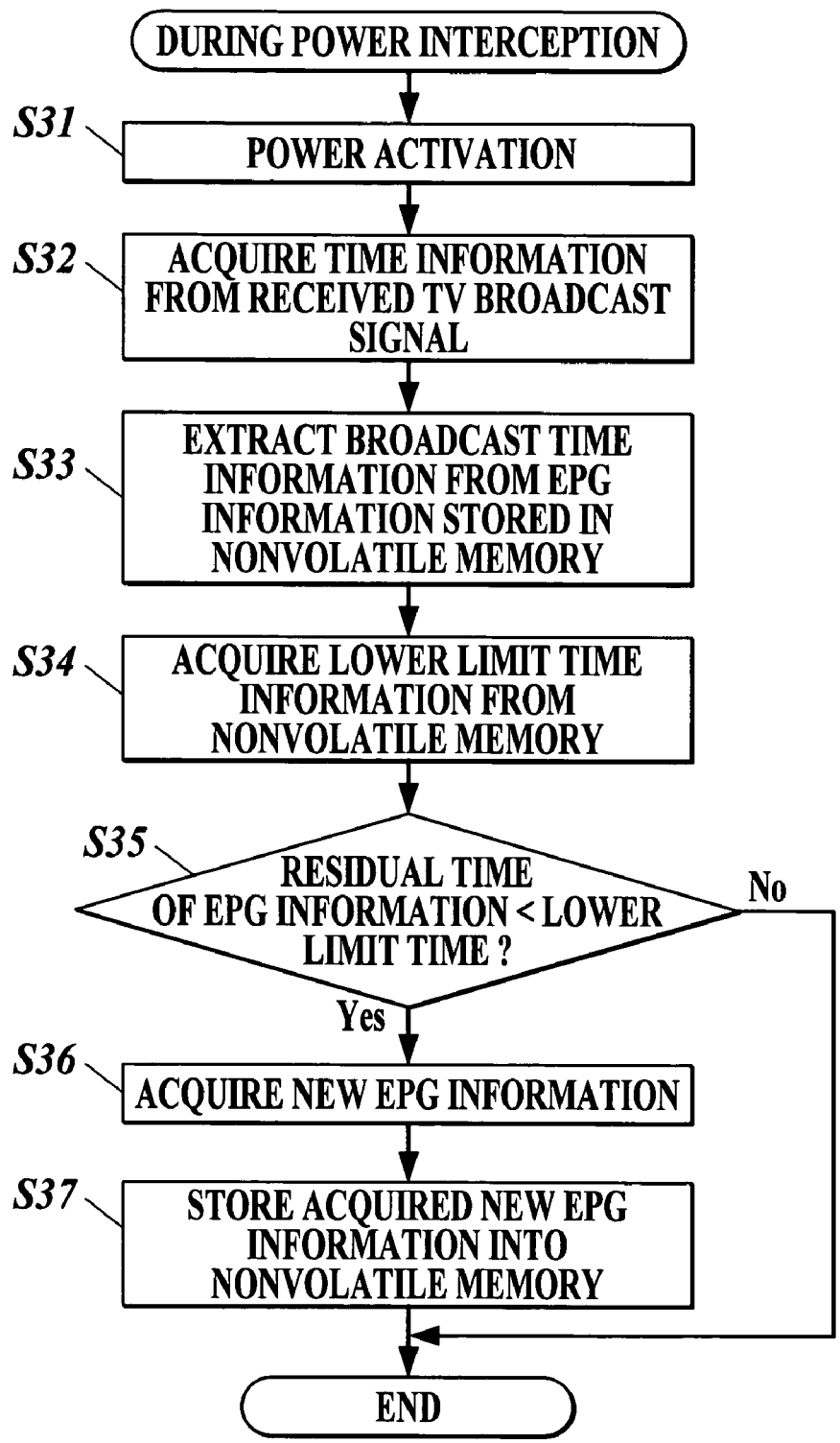
FIG. 5 is a flowchart for illustrating the processing of the acquirement of the EPG information at the time of an activation of the power supply in the television broadcast receiver in the second embodiment.

Next, the processing relative to the acquirement of the EPG information at the time of an activation of the power supply of the television broadcast receiver 30 is described with reference to the flowchart of FIG. 5.

Here, it is supposed that the power supply of the television broadcast receiver 30 is intercepted as a premise.

First, when the power supply of the television broadcast receiver 30 is activated (Step S31), the CPU 16 acquires the time information added to the television broadcast signal from the television broadcast signal received by the tuner 11 through the demodulator 12 and the TS decoder 13 (Step S32).

Next, the CPU 16 executes the extraction program 37c1 to extract the broadcast time information of a previously set final broadcast program among the final broadcast programs of each channel from the EPG information stored in the EPG information storage region 17b3 of the nonvolatile memory 37b (Step S33).

Next, the CPU 16 acquires lower limit time information from the lower limit time information storage region 37b1 of the nonvolatile memory 37b (Step S34).

To put it concretely, at Step S34, the lower limit time information set by an operation of the remote control 381 by the user and stored in the lower limit time information storage region 37b1 in advance is acquired.

Next, the CPU 16 executes the judgment program 37c2 to judge whether the broadcast time of the un-broadcast broadcast program in the EPG information stored in the EPG information storage region 17b3 of the nonvolatile memory 37b (the residual time of the EPG information) is shorter than the lower limit time based on the lower limit time information acquired at Step S34 or not based on the broadcast time information extracted at Step S33 and the time information acquired at Step S32 (Step S35).

When the CPU 16 judges that the residual time of the EPG information is not shorter than the lower limit time (no at Step S35) at Step S35, the CPU 16 ends the present processing.

On the other hand, when the CPU 16 judges that the residual time of the EPG information is shorter than the lower limit time (yes at Step S35) at Step S35, the CPU 16 executes the acquirement control program 37c3 to make the tuner 11 acquire new EPG information (Step S36).

Next, the CPU 16 makes the EPG information storage region 17b3 of the nonvolatile memory 37b store the new EPG information acquired at Step S36 (Step S37), and ends the present processing.

According to the television broadcast receiver 30 in the second embodiment mentioned above, the tuner 11 can receive a television broadcast signal with added time information from a television broadcast wave, and can acquire EPG information from the television broadcast wave. Then, the television broadcast receiver 30 can store the EPG information acquired by the tuner 11 in the EPG information storage region 17b3 of the nonvolatile memory 37b, and can extract the broadcast time information of a previously set final broadcast program among the final broadcast programs of each channel (for example, the broadcast start time information in the broadcast time information of the earliest end final broadcast program) from the EPG information stored in the EPG information storage region 13b with the CPU 16, which has executed the extraction program 37c1. The television broadcast receiver 30 can set a lower limit time by an operation of the remote control 381 by a user, and can judge whether the broadcast time of the un-broadcast program in the EPG information stored in the EPG information storage region 17b3 is shorter than the lower limit time set by the operation of the remote control 381 by the user or not based on the broadcast time information extracted by the CPU 16, which has executed the extraction program 37c1, and the time information added to the television broadcast signal received by the tuner 11 immediately after the activation of the power supply of the television broadcast receiver 30 with the CPU 16, which has executed the judgment program 37c2, at the time of an activation of the power supply of the television broadcast receiver 30. When the CPU 16, which has executed the judgment program 37c2, has judged that the broadcast time of the un-broadcast broadcast program in the EPG information stored in the EPG information storage region 17b3 is shorter than the lower limit time set by the operation of the remote control 381 by the user, the television broadcast receiver 30 can make the tuner 11 acquire new EPG information with the CPU 16, which has executed the acquirement control program 37c3.

Consequently, because the television broadcast receiver 30 acquires the EPG information only in the case where the time when the power supply of the television broadcast receiver 30 has been intercepted is long and then the un-broadcast EPG information stored in the EPG information storage region 17b3 is little or in the case where there is no un-broadcast EPG information stored in the EPG information storage region 17b3 as the result at the time point of the activation of the power supply of the television broadcast receiver 30, the television broadcast receiver 30 can efficiently acquire the EPG information.

Moreover, by setting the lower limit time, the user can set the quantity of the un-broadcast EPG information stored in the EPG information storage region 17b3, and then the user can comfortably browse EPG information and can select the channel suited for his or her taste from the EPG information.

Third Embodiment

A digital television broadcast signal reception apparatus 50 according to a third embodiment of the present invention is described. The digital television broadcast receiver 50 of the third embodiment is an embodiment which includes a reception unit 60, a multi-directional antenna 52 and a control unit 59 as the modification examples of the reception unit 20 receiving a television broadcast signal and the antenna 111 in the television broadcast receiver 10 of the first embodiment. Accordingly, in FIG. 7, the descriptions of the components having the same functions as those of the first embodiment among the components of the third embodiment are omitted. To put it concretely, the descriptions related to the CPU 16, the RAM 17a, the nonvolatile memory 17b, the storage unit 17c, the remote control reception unit 18 and the remote control 181 in the first embodiment are omitted on the supposition that those of the third embodiment also have the same components. Moreover, a signal processing unit 54 may also have the functions equivalent to those of the demodulator 12, the TS decoder 13, the sound decoder 14 and the image decoder 15 of the first embodiment, and a display unit 58 may also have the functions as the sound output unit 141 and the image display unit 151 in the first embodiment.

Figure 6:
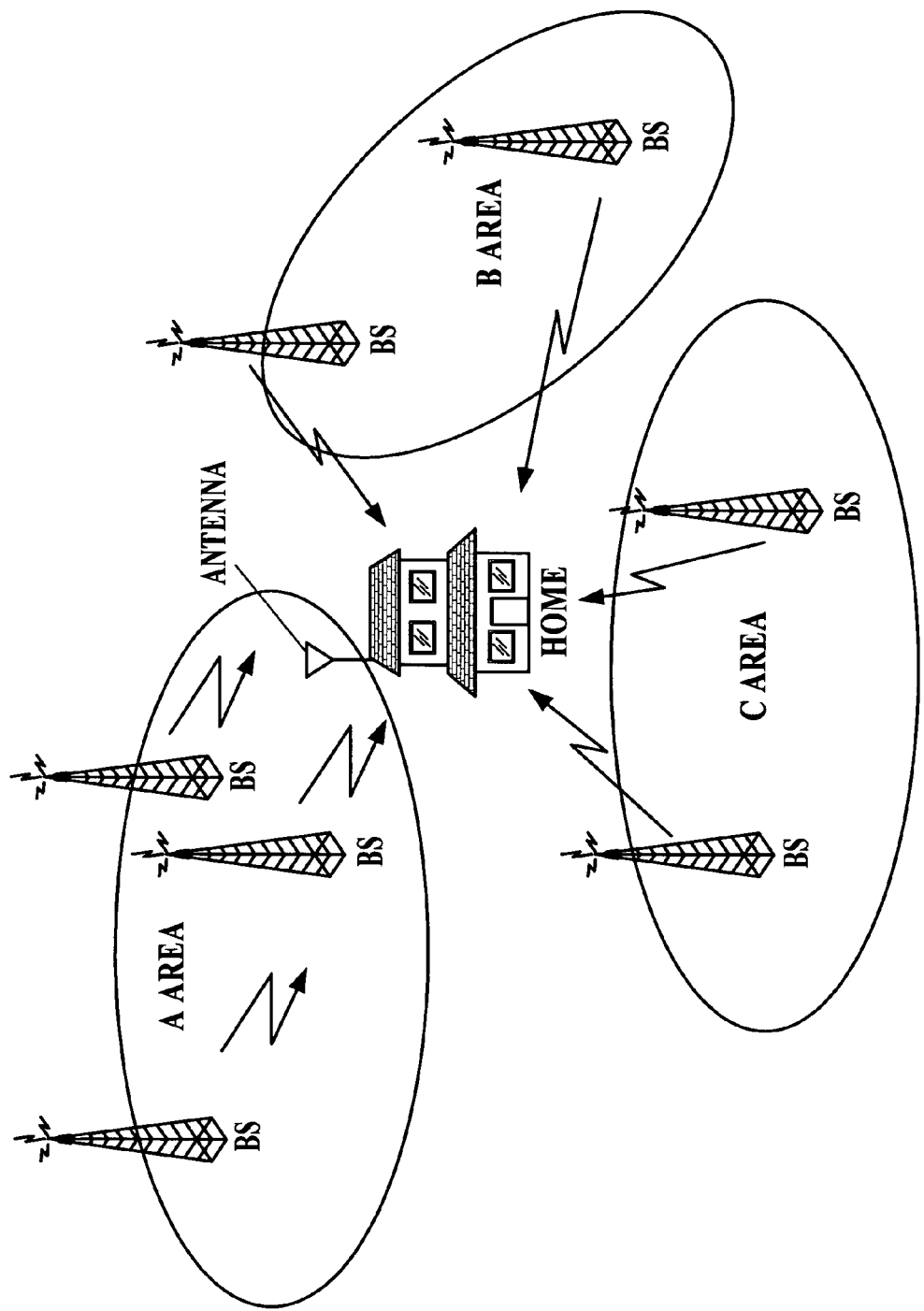
FIG. 6 is a conceptual diagram showing a situation in which a user receives a digital television broadcast signal in the home.

A situation in which a user receives a television broadcast signal in the home is shown in FIG. 6. In the area where digital (ground wave) television broadcast is performed, if the signal reception intensity of a received digital television broadcast signal is equal to a fixed threshold value or more, the images having a fixed quality can be acquired by performing corrections or the like. Consequently, as shown in FIG. 6, it is possible to watch television programs by receiving television broadcast signals transmitted from broadcasting stations BS dotted at a plurality of places of A area, B area, C area and the like. A multi-directional antenna called as a smart antenna having a plurality of reception directions has been put to practical use in response to such a situation.

Various structures, such as a type of changing the reception direction by rotating an antenna with a motor, a type equipped with a plurality of antennas an effective direction of which is changed by turning on/off of electric switches, and the like are conceivable as the multi-directional antenna. The number of the reception directions of the multi-directional antenna is prescribed to be 16 in conformity to the EIA-909 standard, and a digital television broadcast signal reception apparatus in conformity to the EIA-909 standard can be changed to all the 16 reception directions irrespective of the kind, the specifications and the like of the connected multi-directional antenna.

In case the reception direction of the multi-directional antenna is changed in the digital television broadcast signal reception apparatus, generally the highest direction in which the signal reception intensities of the television broadcast signals received in each channel becomes highest is set as the optimum reception direction of the channel. However, because, in the case of the digital television broadcast, an image of fixed image quality can be acquired if the signal reception intensity of a received digital television broadcast signal is equal to the fixed threshold value or more, as mentioned above, it is possible to receive a television broadcast signal of the channel to display the image thereof normally on a monitor apparatus even if the direction of the television broadcast signal is not necessarily the direction of the highest signal reception intensity. In the description of the present embodiment, the case where the signal reception intensity of a digital television broadcast signal is equal to a fixed threshold value or more is defined as a case where "the television broadcast signal can be normally received."

In a digital television broadcast signal reception apparatus according to the present embodiment, when there is a plurality of reception directions capable of normal reception with a multi-directional antenna in each channel capable of normal reception, reception intensities in the directions from the optimum reception direction to the direction in which the signal reception intensity is equal to the fixed threshold value or more are saved in a storage unit in a priority order of the heights of the intensities of the reception signals. Then, the user manually changes a screen in the order of the heights of the reception intensities, and the reception of the television broadcast signal which the user judged to be the optimum is performed.

Figure 7:
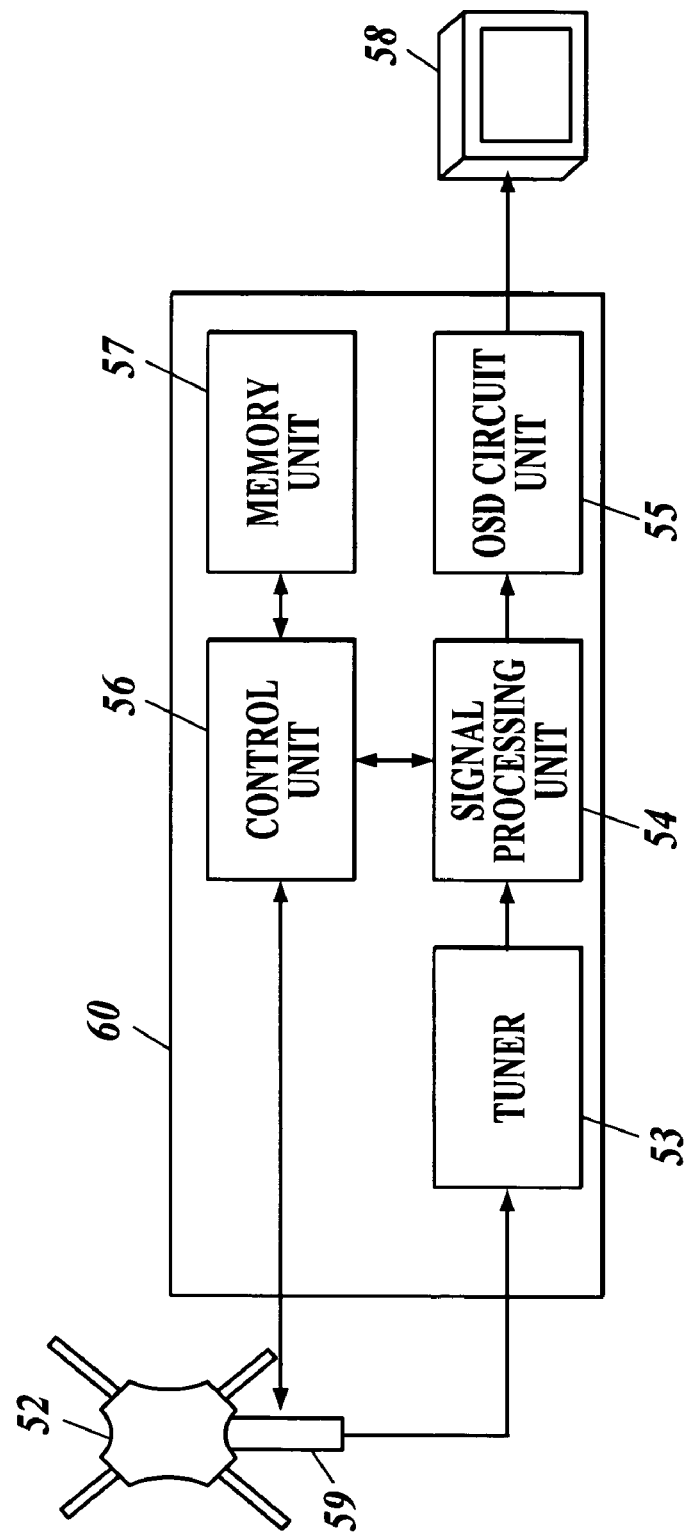
FIG. 7 is a block diagram showing the configuration of a digital television broadcast signal reception apparatus according to a third embodiment of the present invention.

Next, the configuration of the digital television broadcast signal reception apparatus 50 according to the present embodiment is shown in FIG. 7. The reception unit 60 is composed of a tuner (broadcast signal reception means) 53 connected with the multi-directional antenna 52 and receiving a television broadcast signal; the signal processing unit 54 provided with an ATSC front end (digital signal processing means) performing predetermined signal processing to a digital television broadcast signal received by the tuner 53 to decode the digital television broadcast signal, an NTSC decoder decoding an analog television broadcast signal received by the tuner 53, and an MPEG decoder (signal output means) decoding an MPEG compressed television broadcast signal; an on-screen display unit (OSD) 55 superimposing a predetermined display image on a decoded television broadcast signal; a control unit (CPU) 56 (functioning as whole control means) detecting a reception state of the television broadcast signal received by the tuner 53 to control a control unit 59 of the multi-directional antenna 52 (to function as reception direction setting means and control signal output means) and to control the ATSC front end, the NTSC decoder and the like of the signal processing unit 54; a memory (storage means) 57 storing the decoded television broadcast signal temporarily and storing the display image to be superimposed on the decoded television broadcast signal; and the like. The television broadcast signal decoded by the signal processing unit 54 is output and displayed on the display unit 58 through the on-screen display unit 55.

The control unit 59 of the multi-directional antenna 52 makes only the instructed direction effective among a plurality of reception directions of the multi-directional antenna 52 in response to a control signal from the control unit 56. When the multi-directional antenna 52 is that of the type of changing the reception direction thereof by rotating the antenna with a motor, the control unit 59 controls the rotation of the motor to turn the antenna into the instructed direction. On the other hand, when the multi-directional antenna 52 is that of the type of changing the effective direction thereof by turning on/off electronic switches, only the electronic switch connected to the antenna of the instructed direction is turned on, and the other electronic switches are turned off.

Figure 8:
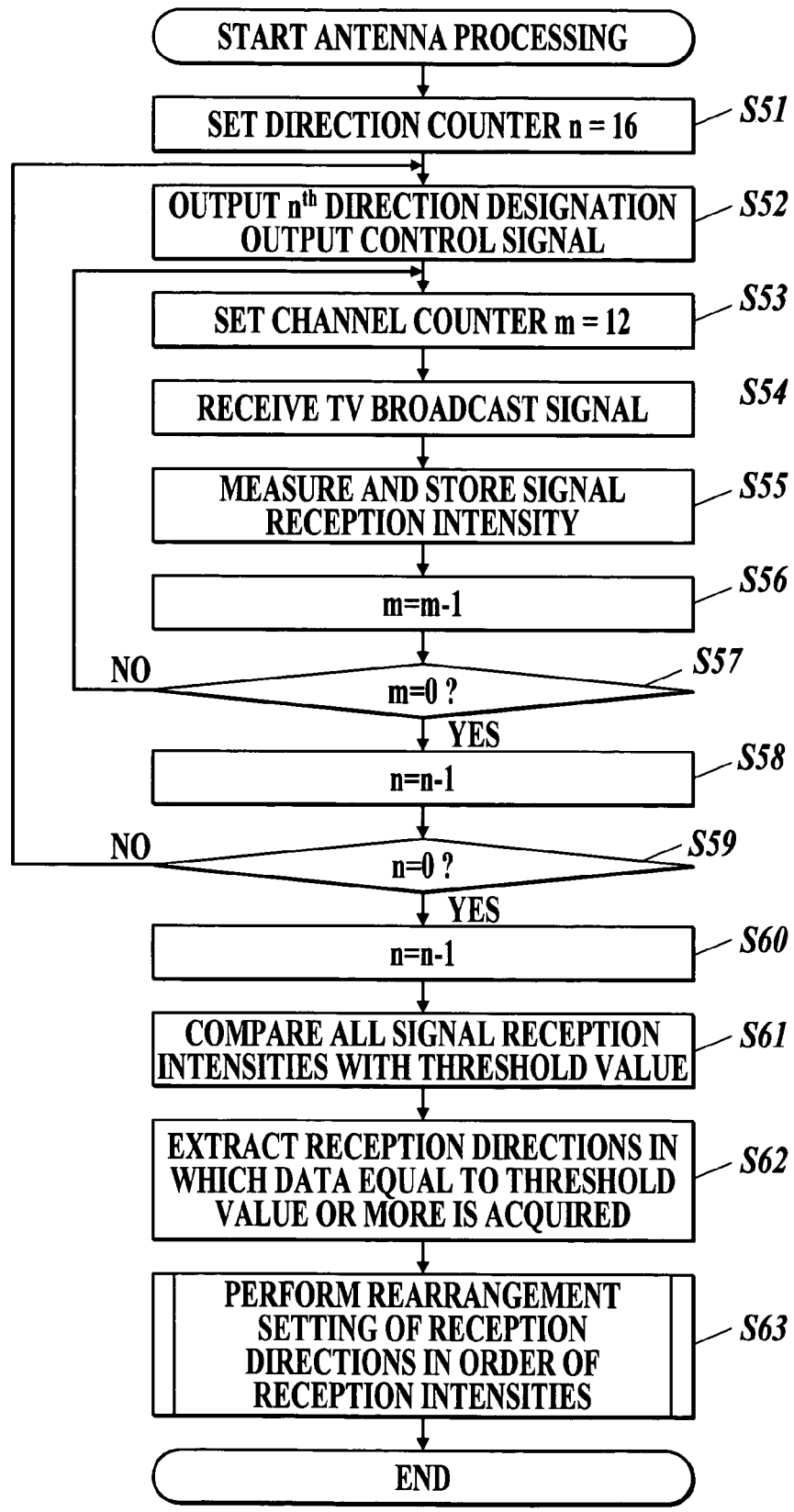
FIG. 8 is a flowchart showing the setting processing of a plurality of reception directions of a multi-directional antenna relative to each channel by the digital television broadcast signal reception apparatus.

Next, the optimum reception direction setting of the multi-directional antenna 52 relative to each receivable channel by the control unit 56 of the reception unit 60 is described with reference to the flowchart shown in FIG. 8.

First, when the control unit 56 detects the connection of the multi-directional antenna 52 to the tuner 53, as the initial operation, the control unit 56 performs the processing (antenna processing) of saving the directions of a first to an $n^{th}$ candidates in the order of the strength of the reception intensity of each channel which can be received by the connected multi-directional antenna 52. When the control unit 56 sets n=16 in a direction counter (Step S51), the control unit 56 outputs a control signal specifying the $n^{th}$ direction (Step S52). After the control unit 56 has output the control signal to the control unit 59 of the multi-directional antenna 52, the control unit 56 further sets, for example, m=12 in a channel counter (Step S53). After a time necessary for changing the reception directions of the multi-directional antenna 52 has elapsed, the tuner 53 receives the television broadcast signals of 12 channels (Step S54). When the control unit 56 receives a television broadcast signal, the control unit 56 measures the signal reception intensity of the received television broadcast signal, and saves the measurement result in the memory 57 (Step S55). And the control unit 56 performs the subtraction of the channel counter by one (Step S56), and judgers whether the signal reception intensities of the digital television broadcast signals have been measured about all the 12 channels (Step S57). When the signal reception intensities of the television broadcast signals have not been measured yet to all the 12 channels, the processing returns to Step S53 and the signal reception intensity of the digital television broadcast signal of the next channel is measured. When the signal reception intensities of the television broadcast signals have been measured to all the 12 channels (yes at Step S57), the control unit 56 performs the subtraction of the number of the direction counter by one (Step S58), and judges whether the signal reception intensities of the digital television broadcast signals of all the 16 reception directions have been measured or not (Step S59). When the signal reception intensities of the television broadcast signals have not been measured to all the 16 reception directions, the processing returns to Step S52, and the signal reception intensity of the digital television broadcast signal is measured to the next reception direction.

When the measurements of the signal reception intensities of the television broadcast signals of the 12 channels have been completed to all the 16 reception directions (yes at Step S59), the control unit 56 reads the measurement data saved in the memory 57, and compares all the measured signal reception intensities with a predetermined threshold value (Step S61). And the control unit 56 extracts the reception directions in which the data of the signal reception intensities indicating values equal to the threshold value or more in each of the 12 channels (Step S62), and performs the rearrangement setting of the obtained reception directions in the order of the largeness of the reception intensities (Step S63).

Figure 9:
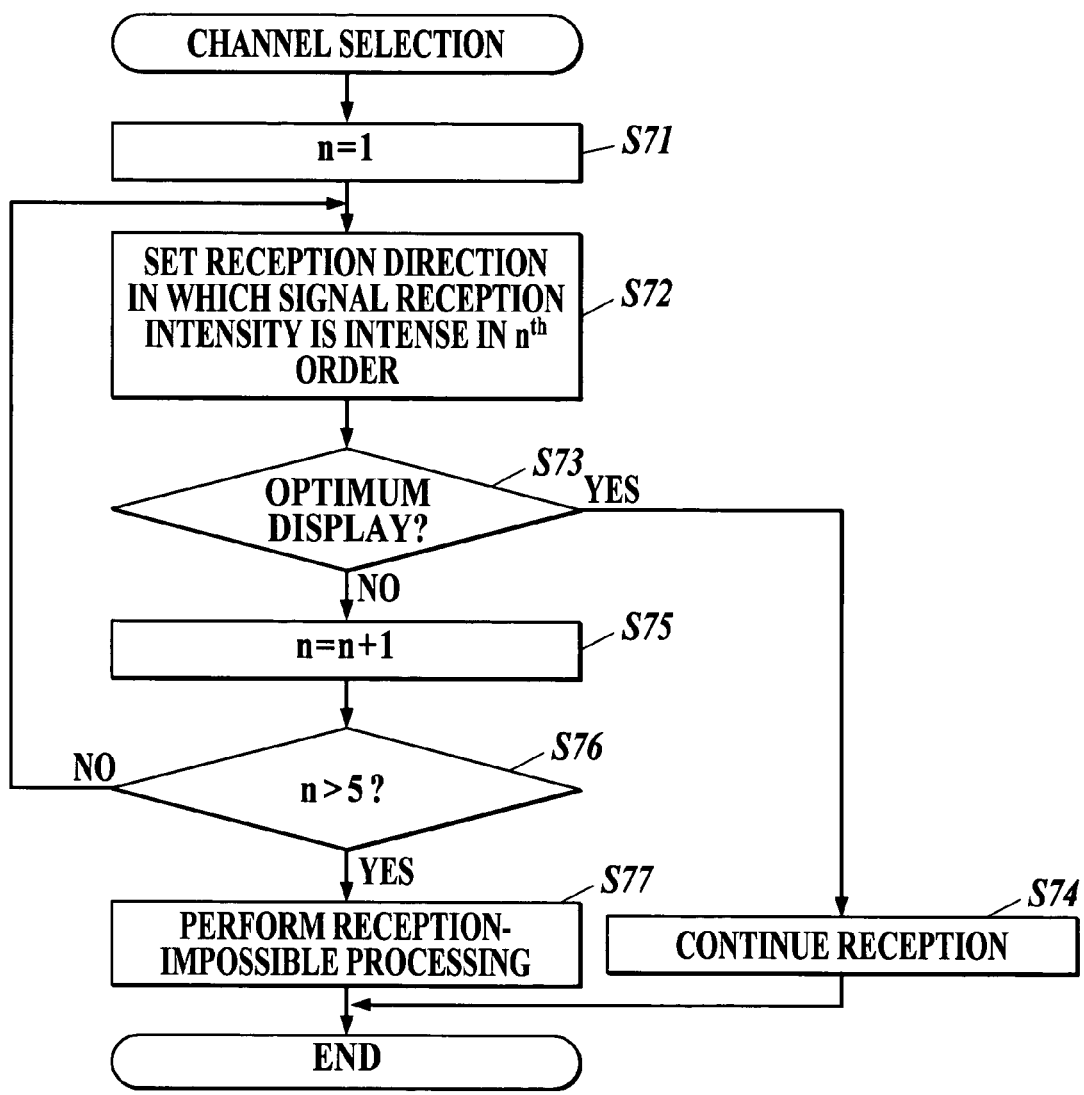
FIG. 9 is a flowchart showing a subroutine of setting the optimum reception direction, a second candidate thereof, and a fifth candidate thereof in the flowchart of FIG. 8.

Next, the reception direction change processing at the time of selecting a certain channel by a user is described with reference to the flowchart shown in FIG. 9. Here, a case where the user selected the channel and five pieces of data of the signal reception intensities indicating the values equal to the threshold value in the channel or more are obtained is shown. When the user selected the certain channel, first, the control unit 56 reads the direction showing the maximum reception intensity (n=1) of the channel selected from the memory 57, and outputs a control signal to the control unit 59 of the multi-directional antenna 52. Then, the control unit 59 sets the reception direction of the multi-directional antenna 52 in the maximum reception intensity direction of the selected channel (Steps S71, S72). Next, the control unit 56 receives a television broadcast signal acquired from the direction of the set reception intensity, and makes the display unit 58 display an image based on the received television broadcast signal. When the user judges that the image is in the state of the optimum display (Step S73; Yes), the control unit 56 continues the reception of the television broadcast signal as it is (Step S74).

On the other hand, when the user judges that the display of the television broadcast signal is not optimum (Step S73; No), for example, by a depression of a down button of the remote control by the user, the control unit 56 reads the second largest reception intensity direction in the selected channel, and sets the reception direction of the multi-direction antenna 52 to the direction showing the second largest reception intensity (n=2) in the selected channel (Steps S75, S72) to make the display unit 58 display the image based on the television broadcast signal having the second largest reception intensity. When the user judges that the display is the optimum one (Step S73; Yes), the control unit 56 continues the reception of the television broadcast signal as it is (Step S74). Then, when the user judges that the display of the television broadcast signal is not the optimum one (Step S73; No), by a re-depression of the down button of the remote control by the user, the control unit 56 reads the third largest reception intensity direction in the channel selected from the memory 57, and sets the reception direction of the multi-directional antenna 52 to the direction showing the third largest reception intensity (n=3) in the selected channel (Step S75, S72) to make the display unit 58 display the image based on the television broadcast signal showing the third largest reception intensity. When the user judges that the display is the optimum one (Step S73; Yes), the control unit 56 continues the reception of the television broadcast signal as it is (Step S74).

Because it is considered that the broadcast signal of the channel is not transmitted by a certain reason when the user is unable to judge any of the second to the fifth candidates of the optimum reception direction set beforehand to be the optimum one (Step S76), the control unit 56 performs reception-impossible processing (Step S77).

As described above, according to the digital television broadcast reception apparatus of the present embodiment, to each of the normally receivable channels, for example, the second to the fifth candidates as well as the optimum reception direction have been set beforehand, and a television broadcast signal can be received by user's sequential changing of the reception direction of the television broadcast signal of the channel which the user regards as the optimum one by the depressions of the remote control.

In addition, the present invention is not restricted to those of the above-mentioned embodiments, and can be suitably changed in the range without departing from the sprit and the scope of the invention.

Although the upper limit time in the first embodiment and the lower limit time in the second embodiment are set by the operations of the remote control (the remote control 181 or the remote control 381) by a user, the present invention is not limited to such embodiments. For example, the upper limit time and the lower limit time may be stored in the television broadcast receiver (the television broadcast receiver 10 or the television broadcast receiver 30) in advance.

Although the broadcast time information of a previously set final broadcast program is set to the broadcast start time information of the broadcast time information of the earliest end final broadcast program, for example, in the second embodiment, the present invention is not limited to such an embodiment. For example, the final broadcast program may be the latest end final broadcast program, and the broadcast time information may be the broadcast end time information. Moreover, the setting of the broadcast time information of the final broadcast program may be set in the television broadcast receiver 30 in advance, or may be set by an operation of the remote control 381 by the user.

The entire disclosure of Japanese Patent Application Nos. 2005-231338 and 2005-231352 filed on Aug. 9, 2005, including description, claims, drawings and summary are incorporated herein by reference.

What is claimed is:

1. A television broadcast receiver comprising:
a reception member to receive a television broadcast signal with added time information from a television broadcast wave;
an acquirement member to acquire broadcast program information from the television broadcast wave;
a program information storage member to store the broadcast program information acquired by the acquirement member;
a time information storage member to store the time information added to the television broadcast signal received by the reception member;
a setting member to set a predetermined time;
a judgment member to judge whether a time period from an interception of a power supply to the television broadcast receiver to a re-activation of the power supply is longer than the predetermined time set by the setting member or not, based on time information stored in the time information storage member just before the interception of the power supply to the television broadcast receiver, and time information added to the television broadcast signal received by the reception member just after the activation of the power supply to the television broadcast receiver, the judgment being performed when the power supply of the television broadcast receiver is activated; and
an acquirement control member to make the acquirement member acquire new broadcast program information when the judgment member judges that the time period from the interception of the power supply to the television broadcast receiver to the re-activation of the power supply is longer than the predetermined time set by the setting member.

2. A television broadcast receiver comprising:
a reception member to receive a television broadcast signal with added time information from a television broadcast wave;
an acquirement member to acquire broadcast program information from the television broadcast wave;
a program information storage member to store the broadcast program information acquired by the acquirement member;
a time information storage member to store the time information added to the television broadcast signal received by the reception member;
a judgment member to judge whether a time period from an interception of a power supply to the television broadcast receiver to a re-activation of the power supply is longer than a predetermined time or not, based on time information stored in the time information storage member just before the interception of the power supply to the television broadcast receiver, and time information added to the television broadcast signal received by the reception member just after the activation of the power supply to the television broadcast receiver, the judgment being performed when the power supply of the television broadcast receiver is activated; and
an acquirement control member to make the acquirement member acquire new broadcast program information when the judgment member judges that the time period from the interception of the power supply to the television broadcast receiver to the re-activation of the power supply is longer than the predetermined time.

3. The television broadcast receiver according to claim 2, wherein the reception member is connectable with a multi-directional antenna, transmits a control signal which makes only one reception direction active among a plurality of reception directions to an antenna controller controlling directivity, and
the reception member comprises:
a control unit to set a reception direction of the television broadcast signal of the multi-directional antenna;
a tuner unit to perform an initial channel setting operation;
a signal processing unit to perform predetermined signal processing to the television broadcast signal received by the tuner unit; and
a storage unit to store a signal transmitted from the signal processing unit to the control unit,
wherein the control unit outputs at a predetermined time interval the control signal so that only one of the plurality of the reception directions of the multi-directional antenna is active,
the signal processing unit performs the predetermined processing to the television broadcast signal of a channel received by the tuner unit at the initial setting, so as to acquire signal reception intensity data to all of the directions capable of receiving the channel, and the signal processing unit transmits the acquired signal reception intensity data to the control unit, and
the control unit stores to the storage unit in a matrix the signal reception intensity data of each of the directions with respect to a channel, and when a certain channel is selected at normal reception, the control unit transmits the control signal from the storage unit to the antenna controller in an order of largeness of the corresponding signal reception intensities, and changes an video corresponding to the activated reception direction, so that a user can set a desired video.

* * * * *

UNITED STATES PATENT AND TRADEMARK OFFICE
CERTIFICATE OF CORRECTION

PATENT NO. : 7,657,908 B2  Page 1 of 1
APPLICATION NO. : 11/501068
DATED : February 2, 2010
INVENTOR(S) : Takagi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 774 days.

Signed and Sealed this

Twenty-eighth Day of December, 2010

David J. Kappos
*Director of the United States Patent and Trademark Office*